United States Patent [19]

Smetz et al.

[11] Patent Number: 4,622,721
[45] Date of Patent: Nov. 18, 1986

[54] CONNECTING DEVICE FOR COMPONENTS AND FOR TENSIONING AND/OR CONTROL DEVICES WITH BELTS

[75] Inventors: Reinhard Smetz, Baldingen; Helmut Speich, Hüttlingen, both of Fed. Rep. of Germany

[73] Assignee: RUD-Kettenfabrik Rieger & Dietz GmbH u. Co., Fed. Rep. of Germany

[21] Appl. No.: 677,185

[22] Filed: Dec. 3, 1984

[30] Foreign Application Priority Data

Dec. 6, 1983 [DE] Fed. Rep. of Germany ....... 3344488
Dec. 6, 1983 [DE] Fed. Rep. of Germany ....... 3344489

[51] Int. Cl.⁴ ............................ B25B 25/00; B66F 3/00
[52] U.S. Cl. ............................ 24/68 CD; 24/68 R; 254/218; 294/74
[58] Field of Search ............... 24/68 CD, 68 R, 19, 24/20 TT, 68 CT, 69 TT, 71 T; 254/218; 294/74, 75; 74/575

[56] References Cited

U.S. PATENT DOCUMENTS

| Re. 30,307 | 6/1980 | Arbogast | 24/68 CD |
|---|---|---|---|
| 491,449 | 2/1893 | Simmons . | |
| 814,024 | 3/1906 | Cue | 254/218 |
| 2,710,436 | 6/1955 | Davis | 24/68 |
| 2,993,680 | 7/1961 | Davis | 24/68 CD |
| 2,998,625 | 9/1961 | Huber | 24/134 |
| 3,120,403 | 2/1964 | Molzan et al. | 294/74 |
| 3,131,450 | 5/1964 | Zinkel, Jr. | 24/197 |
| 3,175,806 | 3/1965 | Prete, Jr. | 24/68 CD |
| 3,749,366 | 7/1973 | Brucker | 24/68 CD |
| 3,804,368 | 4/1974 | Bailey | 24/68 CD |
| 3,826,473 | 7/1974 | Huber | 24/68 CD |
| 3,895,539 | 7/1975 | Weman et al. | 74/575 |
| 4,185,360 | 1/1980 | Prete, Jr. et al. | 24/68 CD |
| 4,199,182 | 4/1980 | Sunesson | 24/68 CD |
| 4,227,286 | 10/1980 | Holmberg | 24/68 CD |
| 4,324,022 | 4/1982 | Prete, Jr. | 24/68 CD |
| 4,365,391 | 12/1982 | Chapalain | 24/197 |
| 4,422,218 | 12/1983 | Brasseux | 24/68 CT |
| 4,493,135 | 1/1985 | Crook, Jr. | 24/197 |

FOREIGN PATENT DOCUMENTS 579154  12/1956  Italy ................... 24/68 CD

*Primary Examiner*—Victor N. Sakran
*Attorney, Agent, or Firm*—Mark P. Stone; F. Eugene Davis, IV

[57] ABSTRACT

In a connecting device for components to a belt (14), a belt connection (7) mounted rotatably in the device is used, which is connected integrally in rotation to a ratchet wheel (9) which exhibits only one tooth (10) with which a detent pawl (11) is associated. The belt (14) can be connected rapidly and safely to the device by rotating the belt connection (7).

12 Claims, 11 Drawing Figures

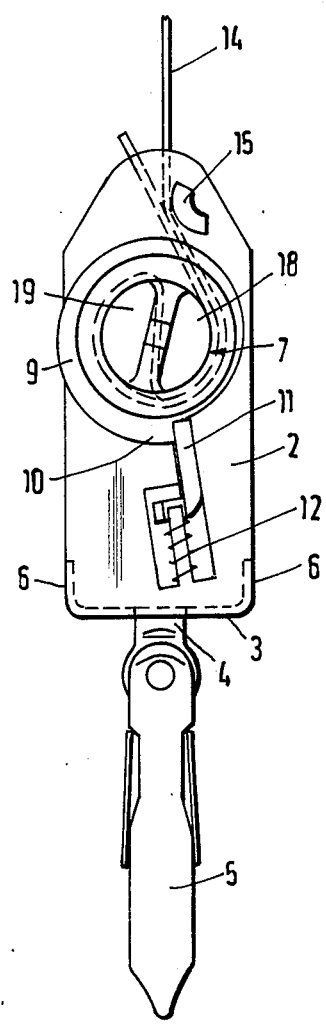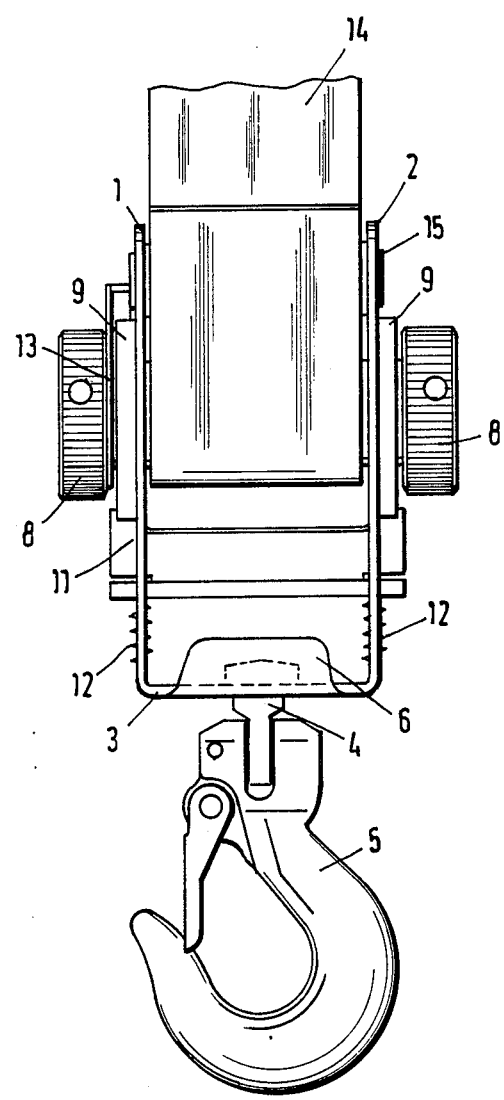

4,622,721

CONNECTING DEVICE FOR COMPONENTS AND FOR TENSIONING AND/OR CONTROL DEVICES WITH BELTS

BACKGROUND OF THE INVENTION

The invention relates to a connecting device for components—such as hooks, eyes, shackles, chain links et cetera—and for tensioning and/or control devices of hoisting and/or lashing arrangements with belts.

Devices of the above-mentioned type are known which are provided with a detachable bolt which is introducible into a stitched loop arranged at the end of a belt. There are also devices of the type in question which exhibit bolts and/or cross-members arranged at a mutual interval, into which a smooth belt end is introducible. The latter devices not only present the advantage that loopless belt ends can be connected by them to a component or the like, but that simultaneously a modification of the length of the connected belt is possible. However, all the relevant known solutions fail to give complete satisfaction inasmuch as the threading-in and threading-out of the belt end into and out of the belt connection is extraordinarily tedious. A second, and not less significant, reason is that the correct, and consequently the only safe, belt connection is ensured only when the relevant device is used by trained personnel.

The underlying aim of the invention is to produce a device of the type in question which can be handled rapidly, comfortably and safely even by untrained personnel.

SUMMARY OF THE INVENTION

This aim is achieved according to the invention in that the device exhibits a belt connection mounted rotatably between mutually opposite side walls, which is provided with an introduction slot for the belt and is connected integrally in rotation to at least one ratchet wheel which exhibits only one tooth, with which a resiliently mounted detent pawl is associated.

The device according to the invention presents the advantage that its user has only to introduce the free belt end into the introduction slot of the belt connection, and then to rotate the latter through 360°.

BRIEF DESCRIPTION OF THE DRAWINGS

Further particulars and features of the device according to the invention will appear from the subordinate claims and from the following description of the accompanying drawing, wherein:

FIG. 1 shows the side elevation of a device,

FIG. 2 shows the elevation of the device according to FIG. 1,

DESCRIPTION OF THE PREFERRED EMBODIMENT

Figure 3:
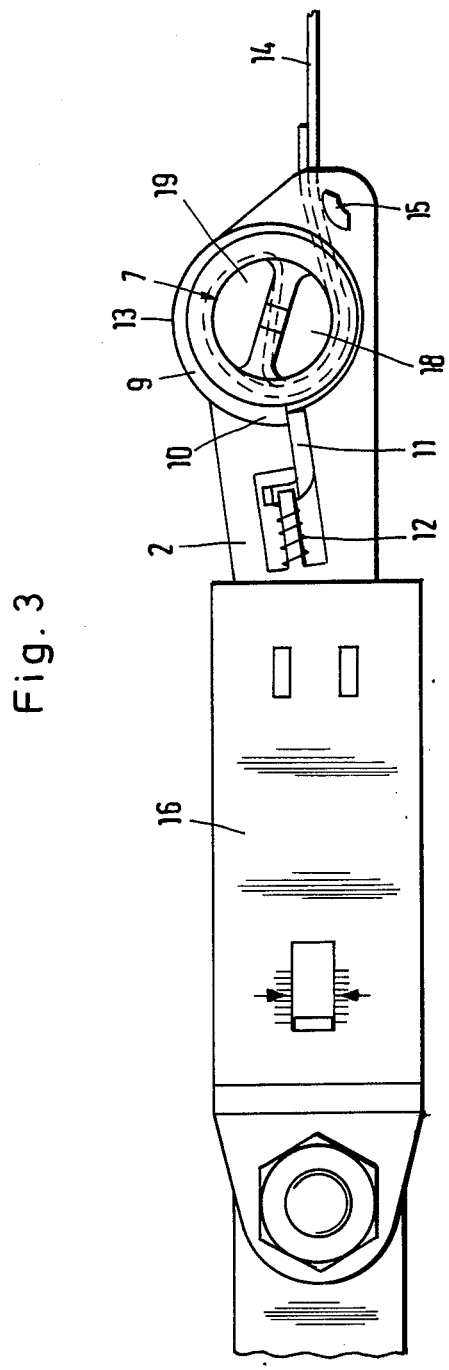
FIG. 3 shows the side elevation of a device of a varied construction.

FIGS. 1 and 2, reference numerals 1 and 2 designate two side walls mutually connected via a yoke 3. A swivel 4, which is mounted rotatably in the yoke, is connected to a component 5 formed by a hook. 6 are webs to reinforce the yoke. The side walls 1 and 2, and the webs 6, are formed by a stamping. A belt connection 7 is mounted rotatably in the side walls 1 and 2. Operating knobs 8, preferably knurled, which are arranged at the ends of this belt connection, permit a rapid rotation of the belt connection 7. Ratchet wheels 9, which exhibit only a single tooth 10, are connected integrally in rotation to the belt connection. A detent pawl 11, which is pressed by springs 12 into the position shown in FIG. 1 and FIG. 2, cooperates with the tooth 10. A return spring 13 ensures that the tooth 10 comes into abutment against the detent pawl 11 even in the absence of a belt 14. 15 is a belt guide bar which defines the position of the outgoing belt and ensures an adequate angle of wrap of the belt connection 7 by the belt 14.

Whereas a connecting device for a belt to a component formed by a hook is illustrated in FIGS. 1 and 2, FIG. 3 shows a connecting device for a belt to a control device 16 for the belt tension. The design of the second device corresponds entirely to the design of the first construction described. The same reference numerals have therefore been used for identical parts.

Figure 4:
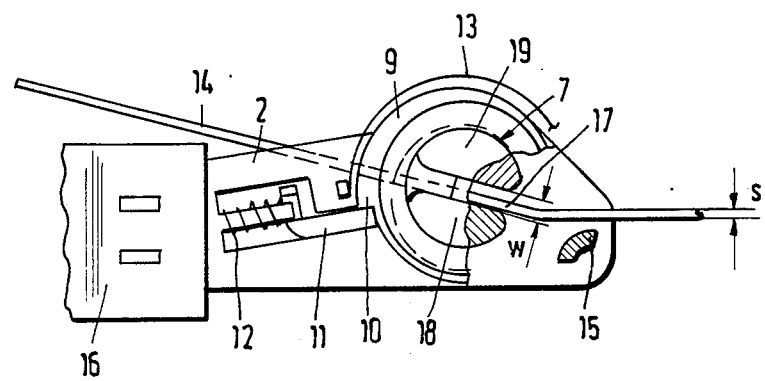
FIG. 4 shows a detail of the device according to FIG. 3 in a first position.
Figure 5:
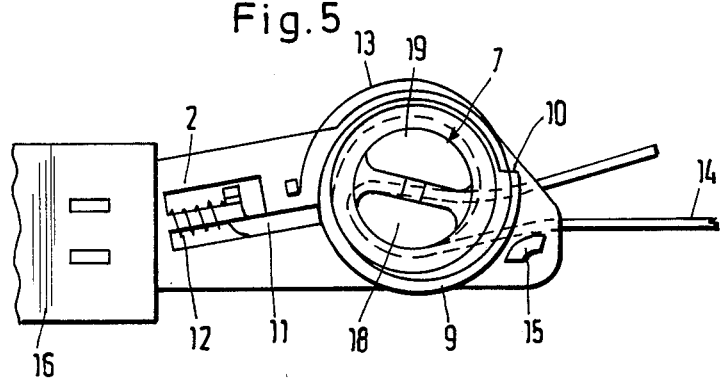
FIG. 5 shows a detail of the device according to FIG. 3 in a second position.
Figure 6:
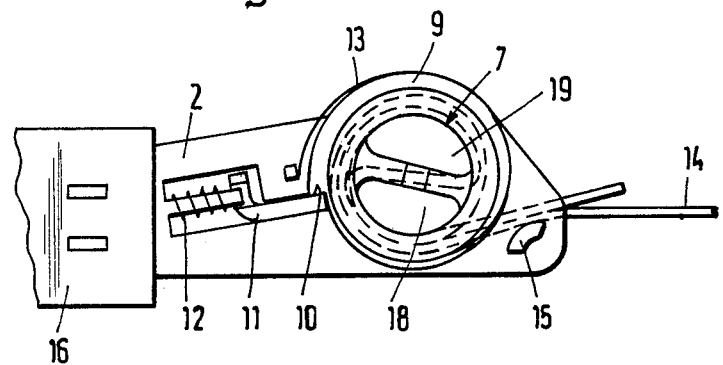
FIG. 6 shows a detail of the device according to FIG. 3 in a third position.

FIGS. 4–6 illustrate the introduction of a belt 14 into a device of the type described. As may be seen from FIG. 4, the belt end is introduced into the introduction slot 17 of the belt connection, which is formed by two cross-members 18 and 19 having a circular segment-shaped profile, which are mutually connected at both their ends by the ratchet wheels 9 and are additionally held together by the operating knobs 8. The width w of the introduction slot 17 is substantially equal to twice the thickness s of the belt 14 to be connected. As soon as the belt has been transferred into the position illustrated in FIG. 4, the belt connection 7 is rotated clockwise through 360°. FIG. 5 shows an intermediate position. It will be seen clearly that the belt is wound up automatically onto the belt connection 7. FIG. 6 shows the final position, in which the tooth 10 is in abutment against the detent pawl 11 after a revolution of 360°. For the release of the belt 14, the detent pawl needs only to be removed from the region of the tooth 10 counter to the force of the spring 12.

Figure 7:
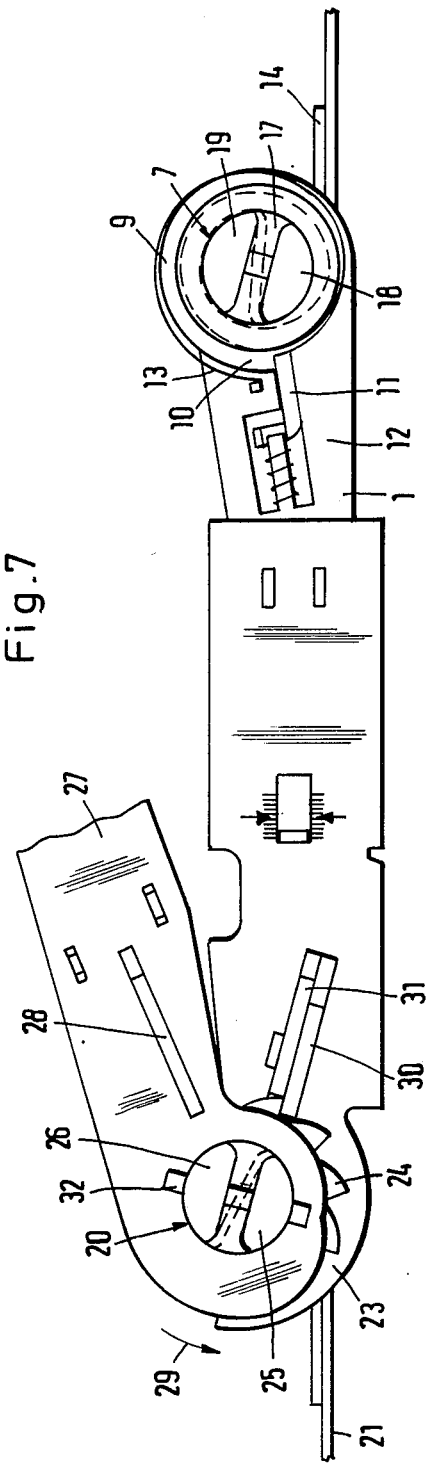
FIG. 7 shows the side elevation of a further device constructed as a belt ratchet.
Figure 8:
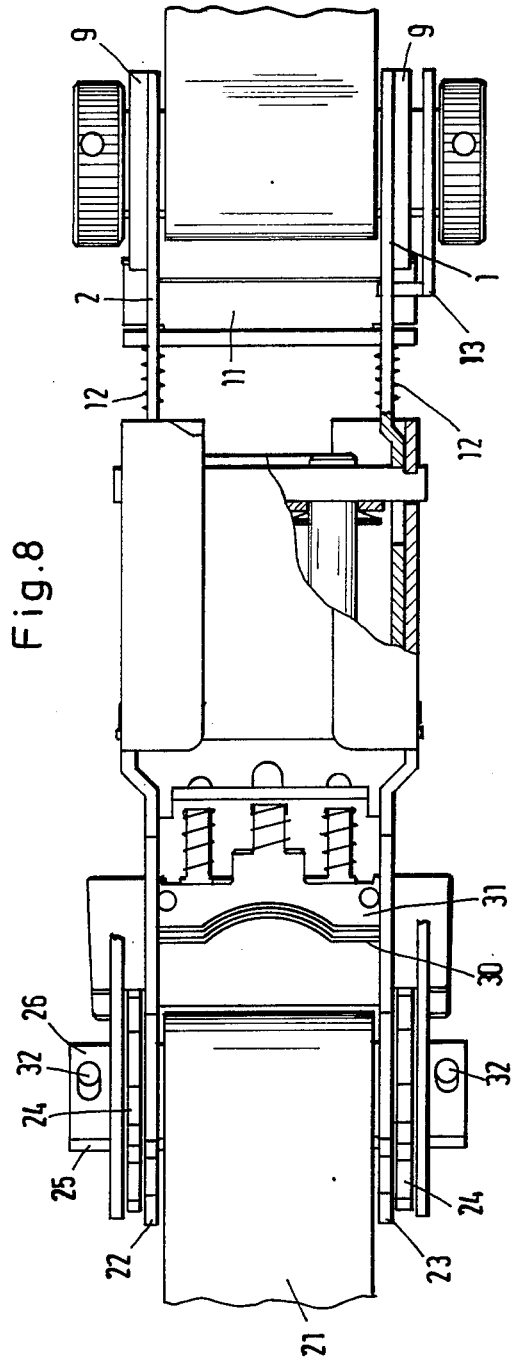
FIG. 8 shows the plan of the belt ratchet according to FIG. 7.

FIGS. 7 and 8 show a device of the type in question constructed as a belt ratchet, which exhibits in addition to the belt connection 7 a further belt connection 20, into which a belt 21 has been introduced. The further belt connection 20 is mounted between side walls 22 and 23 which are slidable relative to the side walls 1 and 2 of the first belt connection 7. It is provided with ratchet wheels 24 which exhibit a plurality of teeth. The ratchet wheels 24 are connected integrally in rotation to cross-members 25 and 26 of the belt connection 20. They can be rotated counter-clockwise in the direction of the arrow 29 by means of a drive lever 27, which exhibits a resilient drive pawl 28. The end of the belt 21 then winds up more or less on the cross-members 25 and 26 of the belt connection 20. Resilient detent pawls 30 and 31 prevent an accidental backward rotation of the ratchet wheels 24 under load.

32 are tensioning pins mutually connecting the cross-members 25 and 26.

Figure 9:
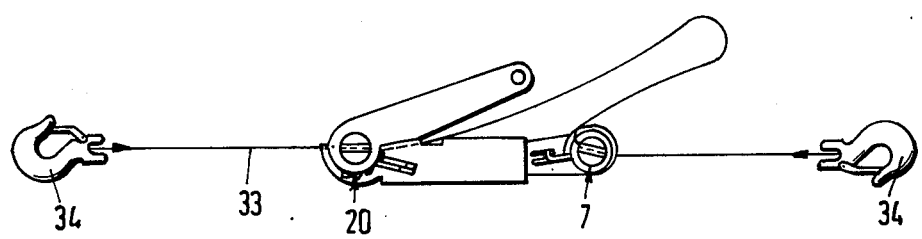
FIG. 9 shows the use of the belt ratchet according to FIG. 8 in combination with a continuous belt in a position in which the belt is freely movable relative to both belt connections.
Figure 10:
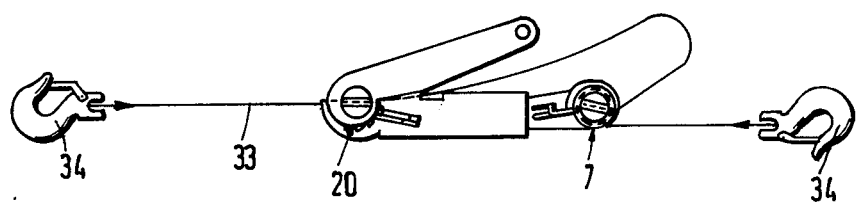
FIG. 10 shows the belt ratchet according to FIG. 9 with the second belt connection 6 fixed and FIG. 11 shows the belt ratchet according to FIGS. 9 and 10 after the operation of the drive lever for the first belt connection.
Figure 11:
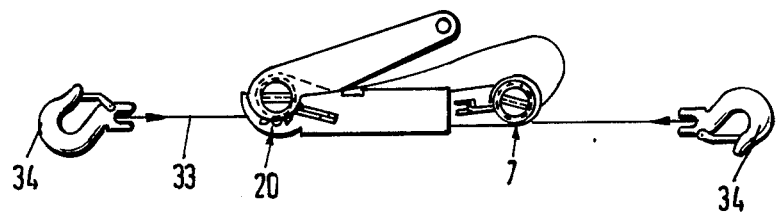

FIGS. 9 and 10 show the use of a belt ratchet in combination with a continuous belt 33, to the ends of which hooks 34 are attached. FIG. 9 shows the position of the belt connections 7 and 20 in a position in which the belt 33 is freely movable through the introduction slots of both belt connections. In FIG. 10 the belt 33 is already fixed on the side of the belt connection 7. Lastly, in FIG. 11, the belt 33 is also locked in the region of the belt connection 20 and the belt is tensioned.

We claim:

1. A connecting device for components—such as hooks (5), eyes, shackles, chain links or the like—for tensioning devices of hoisting arrangements, for tensioning devices of lashing arrangements, for control devices of hoisting arrangement and for control devices of lashing arrangements with belts, which exhibits a belt connection (7) mounted rotatably between mutually opposite side walls, (1,2), which is provided with an introduction slot (17) for the belt (14) and is connected integrally in rotation to at least one ratchet wheel (9) which exhibits only one tooth (10), with which a resiliently mounted detent pawl (11) is associated.

2. A device as claimed in claim 1, wherein the tooth (10) is constitutes as a unilaterally acting arresting stop.

3. A device as claimed in claim 2, wherein the belt connection (7) is provided with a return spring (13) to transfer the ratchet wheel (9) into its arrested position.

4. A device as claimed in claim 1, wherein the belt connection (7) is provided with a return spring (13) to transfer the ratchet wheel (9) into its arrested position.

5. A device as claimed in claim 1, wherein the belt connection (7) exhibits cross-members delimiting the introduction slot (17).

6. A device as claimed in claim 4, wherein the cross-members have a circular segment shaped profile.

7. A device as claim in claim 1, wherein the width (w) of the introduction slot (17) of the belt connection (7) is substantially equal to twice the thickness (s) of the belt (14) to be connected.

8. A device as claimed in cliam 1, wherein the side walls (1, 2) are mutually connected by a yoke (3).

9. A device as claimed in claim 9, wherein the yoke (3) exhibits a bearing for a rotatable component (4).

10. A connecting device for components—such as hooks (5), eyes, shackles, chain links or the like—for tensioning devices of hoisting arrangements, for tensioning devices of lashing arrangements for control devices of hoisting arrangements and for control devices of lashing arrangements with belts which exhibits a belt connection (7) mounted rotatably between mutually opposite side walls (1,2), which is provided with an introduction slot (17) for the belt (14) and is connected integrally in rotation to at least one ratchet wheel (9) which exhibits only one tooth (10), with which a resiliently mounted detent pawl (11) is associated, wherein at least one belt guide bar (15) mutually connecting the side walls (1,2) carrying the belt connection (7) is arranged parallel to the belt connection (7) and at an interval therefrom.

11. A device as claimed in claim 10, wherein the belt guide bar (15) is provided with a curved guide surface for the belt (14).

12. A connecting device for components—such as hooks (5), eyes, shackles, chain links or the like—for tensioning devices of hoisting arrangements, for tensioning device of lashing arrangements for control devices of hoisting arrangements and for control devices of lashing arrangements with belts which exhibits a belt connection (7) mounted rotatably between mutually opposite side walls (1,2), which is provided with an introduction slot (17) for the belt (14) and is connected integrally in rotation to at least one ratchet wheel (9) which exhibits only one tooth (10), with which a resiliently mounted detent pawl (11) is associated, said device being constructed as a belt ratchet having two mutually opposite belt connections (7, 20), whilst in known manner the further belt connection (20) is likewise mounted between mutually opposite side walls (22, 23) and is provided with an introduction slot for a further belt (21) and with at least one ratchet wheel (24) exhibiting a plurality of teeth, the drive of which is effected by a pivotable drive lever (27) which exhibits a resilient drive pawl (28) engageable with the teeth of the ratchet wheel (24) to transfer the further belt connection (20) into different angular positions in which it is lockable by at least one resilient detent pawl (30, 31).

* * * * *

UNITED STATES PATENT AND TRADEMARK OFFICE
CERTIFICATE OF CORRECTION

PATENT NO. : 4,622,721

DATED : November 18, 1986

INVENTOR(S) : Reinhard Smetz and Helmut Speich

It is certified that error appears in the above-identified patent and that said Letters Patent is hereby corrected as shown below:

Column 2, Line 11: Before "FIGS.", add -- In --.

Claim 1, Line 5: Delete "arrangement" and substitute -- arrangements --.

Claim 2, Line 2: Delete "constitutes" and substitute -- constructed --.

Claim 8, Line 1: Delete "cliam" and substitute -- claim --.

Claim 12, Line 4: Delete "device" and substitute -- devices --.

Signed and Sealed this

Seventeenth Day of March, 1987

Attest:

DONALD J. QUIGG

*Attesting Officer*   *Commissioner of Patents and Trademarks*